United States Patent

Iannicelli et al.

[15] 3,661,515
[45] May 9, 1972

[54] METHOD OF BRIGHTENING KAOLIN CLAY BY REMOVING ORGANIC CONTAMINANTS

[72] Inventors: Joseph Iannicelli; Albert C. Kunkle; Robert N. Maynard, all of Macon, Ga.

[73] Assignee: J. M. Huber Corporation, Locust, N.J.

[22] Filed: May 18, 1970

[21] Appl. No.: 37,473

Related U.S. Application Data

[63] Continuation of Ser. No. 654,370, July 19, 1967, abandoned.

[52] U.S. Cl. .............................................23/110 R, 106/72
[51] Int. Cl. ..................C01b 33/26, C04b 33/12, C09c 1/42
[58] Field of Search ...................................23/110 R; 106/72

[56] References Cited

UNITED STATES PATENTS

| | | | |
|---|---|---|---|
| 2,758,010 | 8/1956 | Rowland | 23/110 |
| 3,528,769 | 9/1970 | Lyons | 23/110 |
| 3,290,161 | 12/1966 | Sheldon et al. | 106/288 B |
| 3,477,809 | 11/1969 | Bundy et al. | 106/72 X |
| 3,371,988 | 3/1968 | Maynard et al. | 106/72 X |
| 3,353,668 | 11/1967 | Duke | 106/72 X |

*Primary Examiner*—Edward Stern
*Attorney*—Harold H. Flanders

[57] ABSTRACT

This invention concerns a method for brightening organically contaminated kaolin by treatment of kaolin slurries with an oxidizing agent followed by sedimentation. The oxidizing agent effects an oxidation of organic matter and the simultaneous liberation of discoloring contaminants which are separated from the beneficiated kaolin by hydraulic classification.

2 Claims, No Drawings

3,661,515

METHOD OF BRIGHTENING KAOLIN CLAY BY REMOVING ORGANIC CONTAMINANTS

This application is a continuation of applicants' parent application, Ser. No. 654,370 filed July 19, 1967, now abandoned.

BACKGROUND OF THE INVENTION

1. Field of the Invention

This invention is concerned with a method for improving the brightness of Kaolin clays having an organic content expressed as 0.03 to 0.15 percent carbon based on weight of clay. More particularly, the invention involves the oxidation of organic material in the clay system and the simultaneous settling of discolored contaminants and coarse clay particles.

2. Description of the Prior Art

The value of kaolin clays in many applications depends on the color or brightness. Clays vary considerably in their color properties even when produced from mines in the same district or from different sites in the same deposit. The color of clays is largely due to discoloring mineral contaminants of iron and titanium. A clay is often rejected as unsuitable for commercial use solely on the basis of color even though its other physical properties, such as viscosity and particle size distribution, are within desired limits.

If, in addition to mineral contaminants, organic matter is also present, beneficiation to a desired brightness becomes difficult, if not impossible. Small amounts of organic matter equivalent from 0.03 to 0.15 percent carbon are sufficient to darken clay seriously. Large deposits of gray clays are known but such clays have only limited utility since it is not feasible to attain acceptable brightness levels using prior art methods.

It is well known that the brightness of clays usually is increased by fractionation to finer particle fractions; however, this increase is insufficient for the more discolored clays such as organically contaminated clays. It is also well known to chemically bleach refined clays to achieve satisfactory brightness levels. Bleaching with chemicals such as zinc or sodium hydrosulphite generally results in improved brightness of the refined clay slurries, but this is generally an increase of only 0.5 to 5 brightness points on conventional clays and usually only 0.5 to 2 brightness points on gray clays. Moreover, prior art oxidation methods, including hypochlorite oxidation, used alone or in conjunction with hydrosulfite bleaching have not attained the desired effects.

SUMMARY OF THE INVENTION

Generally, the invention is practiced on a dispersed crude clay slurry, by treating with an oxidizing agent and then permitting the slurry to settle. Organic contaminants are oxidized and these as well as other impurities are liberated and settled with the larger clay particles.

More specifically, organically contaminated crude clay from the mine is chemically dispersed into a water slurry and degritted by passing through a fine screen in a conventional manner. The slurry is then treated with an oxidizing agent and allowed to settle for a period of time sufficient to permit oxidation of organic contaminants and deposition of organic particles and other contaminats.

The slurry is then removed from the sediment for further processing.

The recovered suspension is flocculated, washed, filtered and dried by conventional methods.

The sediment from the settling step is slurried and fractionated to recover a usable coarse fraction. The slurry is flocculated, washed, filtered and dried by conventional methods.

The conventional methods of classification of clay slurries normally increase the clay brightness by about 0.5 to about 5 points above that of the original clay. These refined clays are then generally bleached with known chemical bleaching agents identified hereinbefore which normally increase the brightness of these classified clays from about 2 to about 5 points. These clays are then filtered and dried, which renders the refined clays acceptable for commercial use. Thus with the normal refining procedure of the clay industry, one is able to prepare clays for commercial use having a brightness of not more than around 88 points.

It is known in the kaolin industry that a peptizing agent is used to attain dispersion of clay particles in a slurry in order to facilitate fractionation of kaolin to the desired particle distribution. Under these conditions it is possible to improve brightness of kaolin by preparation of fine fractions of higher surface area. However, the mere step of preparing fine fractions does not necessarily reduce the content of discoloring contaminants, particularly organic contaminants. Indeed, in some cases, fractionation actually concentrates contaminants in the fine fraction.

While the invention has been disclosed as beginning with crude clay, it should be understood that fractions derived from any crude clay containing organic contaminants may be treated by the process of the invention by adjusting the steps to fit the conditions of the starting clay. It has also been determined that a kneading step may either precede or follow the settlement with beneficial results.

With the practice of this invention, the production of clays from gray crudes having brightness values equal or superior to high grade commercial products derived from higher quality crudes becomes economically possible.

DESCRIPTION OF THE PREFERRED EMBODIMENTS

The invention will be more fully understood by the following examples which are illustrative and not limiting. All percentages are by weight unless otherwise indicated; brightness was determined in accordance with TAPPI Procedure T 646 m–54; particle size measurements were made in accordance with TAPPI Procedure T 649 sm–54; and the expression E. S. D. refers to equivalent spherical diameter.

EXAMPLE 1

As a control for the following examples, a crude clay mined in the Aquitanian Basin near Bordeaux, France, was tested and found to have a brightness of 69.0. The clay had an organic contaminant content, expressed as 0.07 percent carbon, and an E. S. D. particle size of 63.7 percent finer than 2 microns. The clay was slurried in water to 40 percent solids using 7 pounds per ton sodium hexametaphosphate (Calgon) as a dispersing agent and was degritted by passing through a 325 mesh screen. The degritted brightness was 72.9. The slurry was then fractionated to a No. 1 coating clay having an E. S. D. particle size of 92.5 percent finer than 2 microns with a brightness of 75.6. A portion of the No. 1 coating clay was bleached conventionally with 10 pounds per ton zinc hydrosulphite and then had a brightness of 78.1. A second portion of this clay was oxidized with 10 pounds of NaOCl per ton of clay, flocculated, filtered and washed, after which the brightness of the fraction was only 85.7.

EXAMPLE 2

A portion of the starting clay of Example 1 was slurried in water to 40 percent solids using 7 pounds per ton Calgon and was degritted by passing through a 325 mesh screen. The clay was treated by adding 10 pounds per ton of sodium hypochlorite and was diluted to 30 percent solids, then placed in a 16-inch column and permitted to stand for 40 hours. The slurry was then siphoned from the sediment, flocculated, washed and dried. The clay had an E. S. D. particle size of 96.8 percent finer than 2 microns and the brightness was 88.3, an increase of 19.3 brightness points over the starting clay and 10.2 points over the conventional hydrosulphite bleached control of Example 1.

EXAMPLE 3

A crude clay mined in the Aquitanian Basin near Bordeaux, France, was tested and found to have a brightness of 76.9. The clay had an organic contaminant content, expressed as 0.04 percent carbon, and an E. S. D. particle size of 65.2 percent finer than 2 microns. A portion of this clay was conventionally processed in the manner set forth in Example 1, resulting in a control bleached brightness of 80.8 with an E. S. D. particle size of 90.8 percent finer than 2 microns.

Another portion of this clay was treated exactly as set forth in Example 2, except that the slurry was diluted to 21 percent solids before settlement. The finished clay had an E. S. D. particle size of 96.9 percent finer than 2 microns, the brightness was 87.2, an increase of 10.3 points over the starting clay and 6.4 points over the control bleached clay.

EXAMPLE 4

A crude clay mined in the Aquitanian Basin near Bordeaux, France, was tested and found to have a brightness of 66.9. The clay had an organic contaminant content, expressed as 0.13 percent carbon, and an E. S. D. particle size of 57.5 percent finer than 2 microns. The clay was conventionally processed in the manner set forth in Example 1, resulting in a bleached brightness of 73.1 with an E. S. D. particle size of 90.5 percent finer than 2 microns.

The starting clay was treated exactly as set forth in Example 2. The finished clay had an E. S. D. particle size of 94.2 percent finer than 2 microns, the brightness was 84.2, an increase of 21.6 points over the starting clay and 11.1 points over the control bleached clay.

EXAMPLE 5

Example 2 was repeated using 5 pounds of sodium hypochlorite per ton of dry clay. The finished clay brightness was 87.1, an increase of 18.1 brightness points over the starting clay and 11.5 points over the conventional hydrosulphite bleached control of Example 1.

EXAMPLE 6

Example 2 was repeated using 15 pounds of sodium hypochlorite per ton of dry slay. The finished clay brightness was 87.6, an increase of 18.6 brightness points of the starting clay and 12.0 points over the conventional hydrosulphite bleached control of Example 1.

Example 2 was repeated with settlement times from 8 hours ranging upward to 61 hours with the following results.

| Time, Hr. | % G. E. Brightness | Particle Size % Less Than 2 Microns |
| --- | --- | --- |
| 8.0 | 84.9 | 85.6 |
| 15.5 | 86.1 | 90.2 |
| 24.0 | 86.9 | 94.2 |
| 40.0 | 88.3 | 96.8 |
| 48.0 | 88.3 | 96.8 |

EXAMPLE 7

A crude clay mined in Middle Georgia was tested and found to have a brightness of 79.1. The clay had an organic contaminant content, expressed as 0.047 percent carbon and an E. S. D. particle size of 73.8 percent finer than 2 microns.

A portion of this clay was conventionally processed in the manner set forth in Example 1, resulting in a control bleached brightness of 82.8 with an E. S. D. particle size of 94.4 percent finer than 2 microns.

Another portion of this clay was slurried in water to 40 percent solids using 6 pounds per ton Calgon and was degritted by passing through a 325 mesh screen. The clay was treated by adding 6 pounds per ton of sodium hypochlorite and was diluted to 30 percent solids, then placed in a 16 inch column and permitted to stand for 40 hours. The slurry was then siphoned from the sediment, flocculated, washed and dried. The clay had an E. S. D. particle size of 86.7 percent finer than 2 microns and the brightness was 85.9, an increase of 6.8 brightness points over the starting clay and 3.1 points over the conventional hydrosulphite bleached control.

EXAMPLE 8

A crude clay mined in Middle Georgia was tested and found to have a brightness of 78.8. The clay had an organic contaminant content, expressed as 0.074 percent carbon, and an E. S. D. particle size of 61.2 percent finer than 2 microns.

A portion of this clay was conventionally processed in the manner set forth in Example 1, resulting in a control bleached brightness of 81.4 with an E. S. D. particle size of 92.7 percent finer than 2 microns.

Another portion of this clay was slurried in water to 40 percent solids using 6 pounds per ton Calgon and was degritted by passing through a 325 mesh screen. The clay was treated by adding 10 pounds per ton of sodium hydrochlorite and was diluted to 30 percent solids, then placed in a 16 inch column and permitted to stand for 40 hours. The slurry was then siphoned from the sediment, flocculated, washed and dried. The clay had an E. S. D. particle size of 96.3 percent finer than 2 microns and the brightness was 83.9, an increase of 5.1 brightness points over the starting clay and 2.5 points over the conventional hydrosulphite bleached control.

EXAMPLE 9

A portion of the starting clay of Example 1 was slurried in water to 40 percent solids using 7 pounds per ton Calgon and was degritted by passing through a 325 mesh screen. The clay was treated by adding 10 pounds per ton of lithium hypochlorite and was diluted to 30 percent solids, then placed in a 16 inch column and permitted to stand for 48 hours. The slurry was then siphoned from the sediment, flocculated, washed and dried. The clay had an E. S. D. particle size of 97.1 percent finer than 2 microns and the brightness was 88.4, an increase of 19.4 brightness points over the starting clay and 10.3 points over the conventional hydrosulphite bleached control of Example 1.

EXAMPLE 10

A crude clay mined in the Aquitanian Basin near Bordeaux, France, was tested and found to have a brightness of 73.2. The clay had an organic contaminant content, expressed as 0.084 percent carbon, and an E. S. D. of 63.5 percent finer than 2 microns. The clay was slurried in water to 40 percent solids using 7 pounds per ton sodium hexametaphosphate and was degritted by passing through a 325 mesh screen. The degritted brightness was 74.5. The slurry was then fractionated to a No. 1 coating clay having an E. S. D. particle size of 92.5 percent finer than 2 microns with a brightness of 77.9. The fraction was bleached conventionally with 10 pounds per ton of zinc hydrosulfite and then had a brightness of 78.2.

EXAMPLE 11

A portion of the starting clay from Example 10 was slurried in the same manner as described in Example 10. The slurry was treated with 40 pounds per ton of active $H_2O_2$ and then allowed to settle in a 16 inch column for 48 hours.

The slurry was siphoned from the sediment, flocculated, filtered, and washed. The resulting clay had an E. S. D. particle size of 95.0 percent finer than 2 microns and a brightness of 84.7, an increase of 10.2 points over the starting clay and 6.2 points over hydrosulfite bleached fine fraction shown in Example 10.

A portion of unbleached fine fraction clay from Example 10 was bleached with 40 pounds per ton of hydrogen peroxide, without the settling step, and produced a brightness of only 81.3.

EXAMPLE 12

A portion of the starting clay from Example 10 was slurried in water to 40 percent solids using 7 pounds per ton Calgon and was degritted by passing through a 325 mesh screen. The clay was treated by adding 10 pounds per ton of NaClO$_2$ and diluted to 30 percent solids. The slurry was placed in a 16 inch column and permitted to stand for 40 hours. The slurry was siphoned from the sediment, flocculated, washed and dried. The clay had an E. S. D. particle size of 96.0 percent finer than 2 microns and a brightness of 84.0. As a control a portion of the unbleached fine fraction prepared in Example 10 was oxidized with 10 pounds per ton of NaClO$_2$, without the settling step, flocculated, filtered and dried and produced a brightness of only 81.8.

EXAMPLE 13

A portion of the starting crude of Example 1 was slurried in water to 40 percent solids using 7 pounds per ton Calgon and was degritted by passing through a 325 mesh screen. The clay was treated by adding 10 pounds per ton of sodium monopersulfate and was diluted to 30 percent solids, then placed in a 16 inch column and permitted to stand for 48 hours. The slurry was then siphoned from the sediment, flocculated, washed, and dried. The clay had an E. S. D. particle size of 95.8 percent finer than 2 microns and the brightness was 81.3, an increase of 12.3 brightness points over the starting clay and 3.2 points over the conventional hydrosulfite bleached control of Example 1.

A portion of the No. 1 coating clay of Example 1 was oxidized with 10 pounds per ton of sodium monopersulfate, without the settling step, flocculated, filtered, washed, and dried, after which the brightness of the fraction was only 78.2.

It should be understood that in the use of conventional sedimentation wherein the suspension is allowed to stand for a period of time, that the oxidation of the organic contaminants occurs simultaneously with the sedimentation. It should also be understood that in the use of the centrifuge the oxidation of the organic contaminants occurs prior to the sedimentation by the centrifuge.

What is claimed is:

1. A method of improving the brightness of gray, crude, mined kaolin clays which are minerally and organically contaminated and wherein the organic contamination of the clay is equivalent to 0.03 to 0.15 percent carbon based on the weight of the clay and wherein only about 65 percent of the clay has an E.S.D. particle size finer than 2 microns comprising the steps of:
    a. dispersing said kaolin clay with a peptizing agent to produce an aqueous dispersion of the clay particles and degritting same by passing through a 325 mesh screen;
    b. adding to said degritted dispersion about 10 pounds of oxidizing agent per ton of clay, said oxidizing agent being selected from the group consisting of sodium hypochlorite, sodium chlorite, lithium hypochlorite, sodium monopersulfate and hydrogen peroxide;
    c. simultaneously oxidizing, liberating and settling said organic discoloring contaminant particles as well as liberating and settling mineral contaminants including iron and titanium from the kaolin clay in said suspension;
    d. separating the suspension from the settled particles;
    e. flocculating, washing and drying the suspension to produce a clay at least 85 percent of which has an E.S.D. particle size finer than 2 microns and said clay having a G.E. brightness of at least about 85.

2. A method of improving the brightness of gray, crude, mined kaolin clays which are minerally and organically contaminated and wherein the organic contaminations of the clay is equivalent to 0.03 to 0.15 percent carbon based on the weight of the clay, said method comprising the steps of:
    a. dispersing said kaolin clay with a peptizing agent to produce an aqueous dispersion of the clay particles;
    b. adding to said dispersion an oxidizing agent in an amount sufficient to oxidize all of the organic contaminates of said clay, said contaminants being equivalent to 0.03 to 0.15 percent carbon, based on the weight of the clay, said oxidizing agent being selected from the group consisting of sodium hypochlorite, sodium chlorite, lithium hypochlorite, sodium monopersulfate and hydrogen peroxide;
    c. simultaneously oxidizing, liberating and settling said organic discoloring contaminant particles as well as liberating and settling mineral contaminants including iron and titanium from the kaolin clay in said suspension;
    d. separating the suspension from the settled particles, and
    e. flocculating, washing and drying the suspension to produce a clay product having a G. E. brightness of at least about 85.

* * * * *